(12) United States Patent
Bollo et al.

(10) Patent No.: US 12,636,998 B2
(45) Date of Patent: May 26, 2026

(54) LIGHTING SYSTEM FOR A VEHICLE HAVING MASK LAYER WITH APERTURES DISPOSED ON A SUBSTRATE LAYER

(71) Applicant: Emergency Technology, Inc., Hudsonville, MI (US)

(72) Inventors: Noah Bollo, Jenison, MI (US); Bradley Miller, Hudsonville, MI (US); Douglas V. Baker, Hudsonville, MI (US); David Salyer, Ada, MI (US)

(73) Assignee: EMERGENCY TECHNOLOGY, INC., Hudsonville, MI (US)

( * ) Notice: Subject to any disclaimer, the term of this patent is extended or adjusted under 35 U.S.C. 154(b) by 0 days.

(21) Appl. No.: 19/282,853

(22) Filed: Jul. 28, 2025

(65) Prior Publication Data

US 2026/0042391 A1 Feb. 12, 2026

Related U.S. Application Data

(60) Provisional application No. 63/681,260, filed on Aug. 9, 2024.

(51) Int. Cl.
| | |
|---|---|
| *B60Q 1/26* | (2006.01) |
| *F21S 41/32* | (2018.01) |
| *F21S 41/43* | (2018.01) |

(52) U.S. Cl.
CPC ............ *B60Q 1/268* (2013.01); *F21S 41/322* (2018.01); *F21S 41/43* (2018.01)

(58) Field of Classification Search
CPC ........ B60Q 1/268; F21S 41/43; F21S 41/322; B32B 17/10541
See application file for complete search history.

(56) References Cited

U.S. PATENT DOCUMENTS

| | | | |
|---|---|---|---|
| 9,925,915 B2 * | 3/2018 | Bauerle | .................. F21S 10/02 |
| 10,227,034 B2 | 3/2019 | Litke | |
| 11,752,933 B2 | 9/2023 | Baker | |

* cited by examiner

*Primary Examiner* — Robert J May
(74) *Attorney, Agent, or Firm* — McGarry Bair PC

(57) ABSTRACT

A lighting system for a vehicle includes an illumination source disposed within the vehicle, configured to emit a light output through a panel of the vehicle. The panel includes a first substrate layer and a mask layer defining light-absorbing properties. The mask layer defines an aperture in registration with the illumination source to allow a first portion of the light output to pass through the first substrate layer. The mask layer is configured to absorb a second portion of the light output that is at least one of reflected or refracted by the first substrate layer.

20 Claims, 8 Drawing Sheets

LIGHTING SYSTEM FOR A VEHICLE HAVING MASK LAYER WITH APERTURES DISPOSED ON A SUBSTRATE LAYER

CROSS REFERENCE TO RELATED APPLICATION(S)

This application claims priority to and benefit of U.S. Provisional Patent Application No. 63/681,260, filed Aug. 9, 2024, which is incorporated herein in its entirety.

TECHNICAL FIELD

The present disclosure generally relates to lighting, and more particularly to specialty lighting for motor vehicles.

BACKGROUND

Many specialty vehicles are fitted with conventional lighting assemblies. The lighting assemblies can be used for a variety of tasks including, for example, signaling and area illumination. In some specialty vehicles such as police vehicles, conventional lighting assemblies can be incorporated within the interior of the vehicle to provide signaling capabilities therefrom. Such interior mounted signaling light assemblies are arranged to project light outwardly from the vehicle, for example through a conventional glass windshield or door window.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

Figure 1:
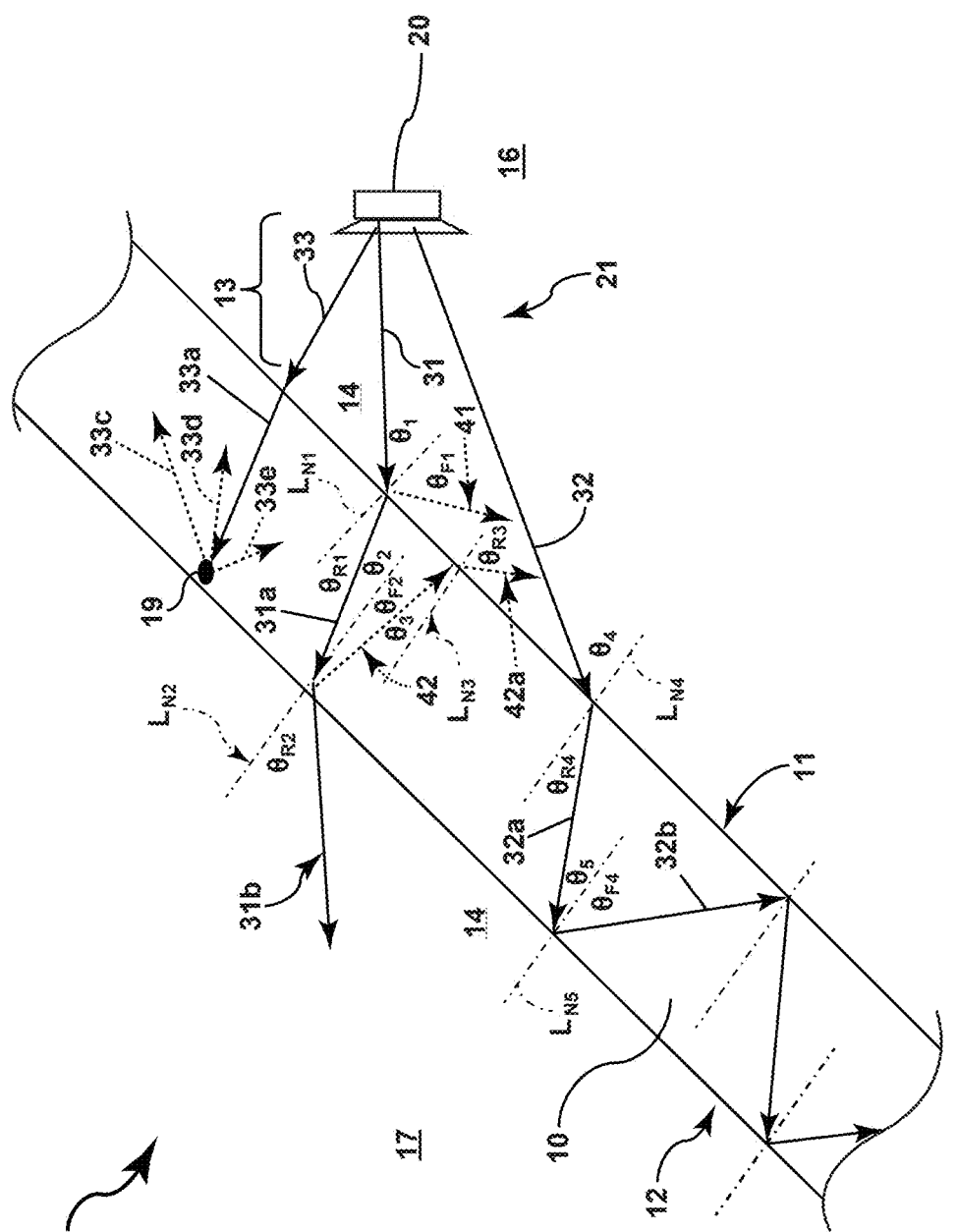
FIG. 1 is a schematic diagram of a conventional lighting system arranged to project light through a window.

Aspects of the disclosure can be implemented in any environment suitable for lighting systems, such as lighting systems for a vehicle, such as a motor vehicle or the like. Non-limiting examples of vehicles can include, but are not limited to, automobiles, trucks, aircraft, watercraft, sport utility vehicles, off-road vehicles, snow mobiles, utility vehicles, emergency vehicles, specific-purpose machines or vehicles (farming equipment, construction vehicles, etc.), or the like. In another, or an additional, example, non-limiting aspects of the disclosure can be included with vehicles including, fitted with, or otherwise carrying lighting such as auxiliary lighting, (e.g., warning and signaling lights, work lights, or assemblies of one or more of these examples), or the like. In this sense, non-limiting aspects of the disclosure can be included or implemented on, at, or with the vehicle. As used herein, lighting systems can be located within the vehicle or attached to the vehicle (permanently or removably mounted), and not attached to the vehicle, or a combination thereof. For brevity of description, and case of understanding, aspects will be described herein in the exemplary context of lighting systems for a vehicle, but other aspects are not so limited.

As used herein, the word "exemplary" means "serving as an example, instance, or illustration." Any implementation described herein as "exemplary" is not necessarily to be construed as preferred or advantageous over other implementations. Additionally, unless specifically identified otherwise, all aspects described herein should be considered exemplary.

As used herein, the terms "first", "second", and "third" may be used interchangeably to distinguish one component from another and are not intended to signify location or importance of the individual components. As used herein, the term "set" or a "bundle" of elements can be any number of elements, including only one. All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof.

As used herein, the terms "axial" or "axially" refer to a dimension along an axis of a component referenced, or relative to an axially-extending direction, such as a ray or vector indication. The term "forward" used in conjunction with "axial" or "axially" refers to moving in a direction toward another component or point of reference (such a direction of movement or traversal). The term "rear," "rearward," or the like, when used in conjunction with "axial" or "axially" refers a direction away or distal from another component or point of reference (such a direction of movement or traversal).

Additionally, as used herein, the terms "radial" or "radially" refer to a direction away from a common center or axis. For example, in the overall context of one non-limiting example of a vehicle, a major longitudinal axis can be defined through the center of the vehicle and extending from the front of the vehicle (relative to the direction of forward travel) through the rear of the vehicle. In this example, radial can refer to a direction extending away from the longitudinal axis of the vehicle, such as laterally (with reference to, for example, Earth horizon) along the vehicle, toward an axial edge, such as a surface including door handles (e.g., perpendicular to the major longitudinal axis). The use of the terms "proximal" or "proximally," either by themselves or in conjunction with the terms "radial" or "radially," refers to moving in a direction toward the center longitudinal axis, or a component being relatively closer to the center longitudinal axis as compared to another component.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, elements being "electrically connected", "electrically coupled," "communicatively coupled", or "in signal communication" can include an electric transmission or signal being sent, received, or communicated to or from such connected or coupled elements. As used herein, the term "angle of incidence" refers to an angle between a ray of light incident on a surface and a line perpendicular or normal to the surface at a point of incidence.

As used herein, the term "reflection" refers to a change in direction of a ray of light at an interface between different media, such that the light ray returns into the medium from which it originated. Also as used herein, a reflection can be specular (e.g., reflecting at the same angle as it originated) or diffuse (e.g., reflecting at multiple angles). As used herein, the term "law of reflection" refers to a principle that a reflected ray of light emerges from a reflecting surface at the same angle to the surface normal as the incident ray, but on the opposing side of a surface normal in the plane formed by the incident and reflected rays (e.g., a specular reflection).

As used herein, the term "Fresnel reflection" refers to reflected light (e.g., a ray) originating from a light ray striking an interface between two different media (e.g., having different refractive indices). A direction of a Fresnel reflection is based on an angle at which the light strikes the interface (angle of incidence) and the properties of both materials.

As used herein, the term "total internal reflection" (TIR) refers to the phenomenon in which light rays arriving at an interface (boundary) between a first medium (e.g., glass) and a second medium (e.g., air) are not refracted into the second medium, but are completely reflected back into the first medium. As used herein, the term "scatter" refers to light reflected in more than one direction due to interactions with particles or irregularities in a medium.

As used herein, the term "refraction" refers to the redirection of a ray (e.g., a light ray) as it passes from one medium to another. The redirection can be caused by a change in speed or a change in the medium. Refraction of a light ray can be accompanied by a partial reflection. As used herein, the term "critical angle" refers to the smallest angle of incidence that yields total reflection, or the largest angle for which a refracted ray exists. For light waves incident from an "internal" medium with a single refractive index N1, to an "external" medium with a single refractive index N2, the critical angle $\theta c$ can be expressed as, $\theta c = \arcsin(N2/N1)$ for $N2 \leq N1$.

As used herein, the term "refractive index" (or indices of refraction) of an optical medium refers to a ratio of the apparent speed of light in a vacuum to the speed of light in the optical medium. The refractive index can be indicative of how much a light ray is bent, or refracted, when entering a material.

As used herein, the term "light pollution" refers to the presence of any unwanted, inappropriate, or excessive artificial lighting, during the day or night. Light pollution can be caused by reflected light rays, refracted light rays, or both. All references to "lighting", "light rays", illumination, or the like include non-visible wavelength emissions, in addition to visible wavelength emissions. In this sense, "visible" and "invisible" wavelength emissions are understood relative to human-detectable visible light wavelengths. "Coupled" in this sense can refer to an optic, lighting element, lighting assembly, or the like, attached, in contact with, in a closely confronting relationship with, or integrated directly to a light transmissive panel (e.g., glass). Conversely, "non-coupled" refers to an illumination source, an optic, lighting element, lighting assembly, or the like, is not attached or integrated to the light transmissive panel, such as an instance where there is an air-gap present between the light transmissive panel and the light source.

Aspects as disclosed herein are directed to lighting systems for a vehicle, such as a specialty vehicle. Specialty vehicle examples may include police vehicles, emergency responder vehicles, school buses, transit buses, fire equipment, sanitation equipment, rail equipment, and highway and transportation support equipment.

Aspects of the lighting systems disclosed herein can include specialty lighting and can include interior mounted lights, positioned for light to be primarily viewed exterior to the driver and passenger compartment(s). The lighting systems can be mounted into, on, or in proximity to a panel of the vehicle, such as a window that is light transmissive (e.g., transparent or translucent). The panel or window can be any type of window, including an articulated or non-articulated window. It should be understood that examples shown herein for a stationary (non-articulated) window can be adapted for movable (articulated) window applications.

The lighting system disclosed herein can be integrated with the vehicle. In various aspects, the lighting system can be provided with electrical and signal connectivity for the vehicle. For example, the lighting system can include a regulated supply power from the vehicle's electrical system and a lighting mode control module.

It should also be understood that the present disclosure is not limited to integrated lighting systems and configurations for specialty vehicles, and that the aspects disclosed herein may be utilized in connection with any panel or window in a motor vehicle or in window applications outside the field of motor vehicles.

Many specialty vehicles (e.g., police vehicles) are fitted with lighting assemblies, such as for signal lighting, scene lighting, or messaging. Since external lighting assemblies (e.g., mounted external to the vehicle), when in an inactivated state, may be more readily seen or observed than internal lighting assemblies (e.g., mounted within the vehicle cabin) by an observer, it can often be desirable to incorporate the lighting assemblies into the vehicle cabin to make the lighting assemblies of the vehicle less conspicuous or more concealed. Other vehicles, such as hybrid and electric vehicles can be fitted with outward-projecting, cabin mounted lighting assemblies to reduce aerodynamic drag and enhance fuel economy relative to conventional externally mounted lighting systems.

In such cases, consideration is often provided for placement of the lighting assembly to enhance awareness or alerting of viewing or viewable users, avoid unnecessary distraction, and improve visibility. For instance, it is desirable to arrange the lighting assembly to project light from the interior of the vehicle while substantially reducing obstruction or distraction of the driver operating that vehicle, or to prevent a substantial amount of light from being directed or redirected into the vehicle cabin toward the vehicle operator.

However, in some conventional outward-projecting, cabin mounted lighting assemblies, at least some of the projected light can be reflected off an inward-facing surface of a windshield or a window, creating glare, and reducing visibility of the driver or passengers. In other typical cases, such as when the windshield is a multi-layer or laminated glass, some of the projected light can be reflected off of mid-layers of the glass, and can propagate internally within the windshield interfering with machine or human visibility. Additionally, in many conventional cabin mounted lighting assemblies, the illumination source is spaced apart from the glass of the vehicle (such as the windshield) resulting in an air gap between the illumination source and the glass. This air gap can allow for the light emitted from the illumination source to reflect into the cabin of the vehicle and impair the vision of the driver, creating glare, haze, or reflections (generally, light pollution) that can impair a driver's vision, attention, ability to respond or react to the environment, or can further reflect light elsewhere in the vehicle (e.g., the dash) that can be undesirable or distracting for the driver.

The mounting arrangement or positioning of conventional internal lighting assemblies can also adversely affect light output. For instance, the orientation of the lighting assembly with respect to windows (e.g. a glass windshield) may result in different angles of incidence, refraction, and reflection of light. The reflected light is more significant when the glass and internal lighting assembly have an angular relationship to each other. This reflected light can enter the vehicle cabin and become an undesirable nuisance or a possible distraction to the driver. The reflected light may unintentionally illuminate the dash, side pillars, roof lining, or other interior features creating a distraction or safety hazard. In other words, a beam of light when emitted from an illumination source of a conventional interior lighting assembly spreads from the illumination source, which creates a variability of the angle of incidence of the light relative to the windshield, and can also become a source of light leakage or light pollution into the vehicle cabin. In another non-limiting example, different light sources can operably generate or enable adversely affected light at, near, or within the vehicle cabin. For instance, light pollution may be affected by a light output based on a solid on state of the light output, flashing or patterning of a light output, intensity of a light output, or the like.

Aspects of the disclosure can allow for or enable overcoming the above noted shortcomings of conventional lighting systems. Non-limiting aspects can be arranged to enhance protection of the driver or passengers from light pollution (e.g., light energy which reflects, refracts, or otherwise reenters the driver's location in the vehicle), to avoid distractions and to improve visibility. Aspects of the disclosure can include a light transmissive panel having a mask layer in combination with, or utilized with coupled or non-coupled, illumination sources. The illumination sources can include for example, lighting elements, lighting assemblies, light emitting diodes, incandescent lighting, or the like. While the aforementioned list includes visible light examples, aspects of the disclosure can be included utilizing non-human-visible lighting or wavelength sources, but will be referred to as "illumination sources" for brevity.

Some non-limiting aspects can include a shroud that encompasses the illumination source (in conjunction with the window). The shroud can facilitate generation of a wedge shaped 'light funnel' or beam while reducing in stray light return. In some aspects, the shroud and mask layer can cooperate to produce a seal against a non-perpendicular vehicle window (e.g., glass), while allowing light output in a controlled beam or path. For instance, aspects can incorporate a shield or shroud, or both, that substantially directs light away from the vehicle cabin to avoid distracting an operator of the vehicle.

Aspects can further provide interior mounted lighting systems that emit light, steady-on or strobing, from a vehicle with reduced stray light return (reflection, refraction, or the like) as compared to conventional lighting systems. Aspects can thus significantly enhance the emission of illumination from within a vehicle while reducing the stray light return of illumination during vehicle operation or during operation of the lighting systems.

The exemplary drawings are for the purposes of illustration only and the dimensions, positions, order and relative sizes reflected in the drawings attached hereto can vary.

FIG. 1 is a ray diagram illustrating the behavior of light rays in a typical lighting system for a vehicle (not shown), having a conventional lighting system 5 including a window 10 (e.g., a windshield). The lighting system 5 includes an illumination source 20 within an interior 16 of the vehicle, configured to provide a light output 21 illustrated as a set of arrows indicative of a bundle of light rays 31, 32, 33. The light output 21 is directed toward the window 10 to pass therethrough to illuminate an exterior 17 of the vehicle.

Conventional motor vehicle windows are often glass. The window 10 has an innermost or inward-facing surface 11 (e.g., facing an interior of the vehicle) and an opposing outward-facing surface 12 (e.g., facing an exterior 17 of the vehicle). The inward-facing surface 11 faces the illumination source 20. The illumination source 20 can be spaced from the inward-facing surface 11, to define a gap 13 therebetween. Air 14 (or another material) can be disposed in the gap 13. The inward-facing surface 11 is disposed between the illumination source 20 and the outward-facing surface 12, with the outward-facing surface 12 typically in contact with air 14 at the exterior of the vehicle.

It will be appreciated that in the presence of light, each of the window 10, the air 14 disposed in the gap 13, or the air 14 at the exterior 17 of the vehicle can be considered to be isotropic refractive media having respective indices of refraction. The direction of light rays traveling through refractive media can be determined using Snell's law which describes the relationship between the angles of incidence and refraction for light waves passing through a boundary between two different isotropic media (e.g., glass and air). As light strikes the border or interface between refractive media at an angle of incidence with respect to a normal line, represented as perpendicular to the interface, the light will either be refracted to a lesser angle, or a greater one depending upon the relative refractive indices of the two media. For example, in the case of light traveling from air into glass, light would be refracted towards the normal line, because the light is slowed down in glass; light traveling from glass to air would refract away from the normal line. More specifically, Snell's law states that, for a given pair of media (e.g., glass and air) having respective refractive indices N1 and N2, then, $N1 \sin \theta_1 = N2 \sin \theta_2$, where $\theta_1$ and $\theta_2$ are the angle of incidence and angle of refraction, respectively, of a light ray crossing an interface between the two media.

In the typical arrangement depicted in FIG. 1, the material (e.g., glass) used to form the window 10, can have a first refractive index N1 that differs from a second refractive index N2 of the air 14 disposed in the gap 13 and at the exterior 17 of the vehicle. As a result, when light strikes the interface or boundary between the window 10 (e.g., glass) and a second medium (e.g., air), both reflection and refraction of the light can occur.

A first portion of the light output 21, illustrated as a first incident ray 31 can be projected from the illumination source 20 through the air 14 (e.g., having the second refractive index N2) toward the window 10 (e.g., having the first refractive index N1). A first angle of incidence $\theta_1$ can be defined between the first incident ray 31 and a perpendicular or first normal line $L_{N1}$ to the inward-facing surface 11 of the window 10 (e.g., a boundary between the window 10 and the air 14). Based on Snell's law, when the first incident ray 31 strikes the inward-facing surface 11, it will travel through the window 10 at a first angle of refraction $\theta_{R1}$ with respect to the first normal line $L_{N1}$ to define a first internal portion 31a of the first incident ray 31. Additionally, based on the law of reflection, a specular component or first Fresnel reflection 41 can reflect from the inward-facing surface 11 into the interior 16 at a first Fresnel reflection angle $\theta_{F1}$ with respect to the first normal line $L_{N1}$. The first Frensel reflection 41 can be considered light pollution within the interior 16.

Following the same principles, the first internal portion 31a of the first incident ray 31 will travel through the window 10 and reach the boundary between the window 10 and the air 14 at the outward-facing surface 12. A second angle of incidence $\theta_2$ can be defined between the first internal portion 31a of the first incident ray 31 and a second normal line $L_{N2}$ to the outward-facing surface 12 (e.g., a boundary between the window 10 and the air 14). When the first internal portion 31a of the first incident ray 31 strikes the outward-facing surface 12, it will travel through the air 14 as a first emergent portion 31b of the first incident ray 31. A second angle of refraction $\theta_{R2}$ can be defined between the second normal line $L_{N2}$ and the first emergent portion 31b. Additionally, based on the law of reflection, a second Fresnel reflection 42 can reflect from the boundary between the window 10 and the air 14 at the outward-facing surface 12 at a second Fresnel reflection angle $\theta_{F2}$ with respect to the second normal line $L_{N2}$.

The second Fresnel reflection 42 will travel through the window 10 and reach the boundary between the window 10 and the air 14 at the inward-facing surface 11. A third angle of incidence $\theta_3$ can be defined between the second Fresnel reflection 42 and a third normal line $L_{N3}$ to the inward-facing surface 11 of the window 10. The second Fresnel reflection 42 will enter the air 14 in the gap 13 at third angle of refraction $\theta_{R3}$ to define a first external portion 42a of the second Fresnel reflection 42. The first external portion 42a of the second Fresnel reflection 42 can be considered light pollution within the interior 16.

Additionally, other light rays from the light output 21 can travel through the window 10 toward the boundary between the window 10 and the air 14 at the outward-facing surface 12 to define a respective angle of incidence between a respective light ray and a corresponding normal line $L_N$ to the outward-facing surface 12. When light is refracted from a medium of higher refractive index (e.g., glass) to a medium of lower refractive index (e.g., air) the angle of refraction (between the outgoing ray and the surface normal line $L_N$) is greater than the angle of incidence (between the incoming ray and the normal line $L_N$). As the angle of incidence approaches a threshold, called the critical angle, the angle of refraction approaches 90°, and the refracted ray becomes parallel to the boundary surface. As will be understood, refraction of a light ray can be accompanied by a partial reflection. However, as an angle of incidence increases beyond the critical angle, the conditions of refraction can no longer be satisfied, so there is no refracted ray, and the partial reflection becomes total resulting in a "total internal reflection" (TIR). For visible light, the critical angle is about 42° for incidence from common glass to air.

As illustrated in FIG. 1, the light output 21 can include a second incident ray 32 projected from the illumination source 20 through the air 14 (e.g., having the second refractive index N2) toward the window 10 (e.g., having the first refractive index N1). A fourth angle of incidence $\theta_4$ can be defined between the second incident ray 32 and a perpendicular or fourth normal line $L_{N4}$ to the inward-facing surface 11 of the window 10 (e.g., a boundary between the window 10 and the air 14). When the second incident ray 32 strikes the inward-facing surface 11, it will travel through the window 10 at a fourth angle of refraction $\theta_{R4}$ with respect to the fourth normal line $L_{N4}$ to define a second internal portion 32a of the second incident ray 32.

The second internal portion 32a of the second incident ray 32 will travel through the window 10 and reach the boundary between the window 10 and the air 14 at the outward-facing surface 12. A fifth angle of incidence $\theta_5$ can be defined between the second incident ray 32 and a fifth normal line Lys to the outward-facing surface 12. The fifth angle of incidence $\theta_5$ can be equal to or greater than a critical angle. For example, in an instance where the window 10 has a refractive index greater than the air 14, and the fifth angle of incidence $\theta_5$ is equal to or greater than the critical angle, (e.g., about 42 degrees) there will be no refracted or emergent ray, and the partial reflection can become a total reflection or TIR with no refracted ray.

The second internal portion 32a of the second incident ray 32 can reflect from the boundary between the window 10 and the air 14 at the outward-facing surface 12 at a fourth reflection angle $\theta_{F4}$ with respect to the fifth normal line LN5 to define a third internal portion 32b. In some instances, (e.g., when the fifth angle of incidence $\theta_5$ is equal to or greater than the critical angle), the third internal portion 32b can repeatedly reflect from the boundary between the window 10 and the air 14 at the inward-facing surface 11, or between the window 10 and the air 14 at the outward-facing surface 12, to essentially become "trapped" within the window 10. In this sense the third internal portion 32b of the second incident ray 32 can define TIR or trapped light, and can be considered light pollution within the interior 16.

In some instances, a portion of the light output 21 can be subject to light scattering. Light scattering in glass refers to the phenomenon where light reflects in multiple directions due to imperfections or irregularities within the glass. The scattering can include Rayleigh scattering or Mie scattering. The irregularities can include surface roughness, inhomogeneities within the glass such as minute particles, bubbles, or structural variations (e.g., variations in density or refractive indices) within the window 10. For example, as illustrated, the window 10 can include an irregularity 19 disposed between the inward-facing surface 11 and the outward-facing surface 12. The light output 21 can include a third incident ray 33, which can include a fourth internal portion 33a that is refracted through the window 10 in accordance with Snell's law. However, in the event that the fourth internal portion 33a of the third incident ray 33 strikes the irregularity 19, a diffuse reflection of the fourth internal portion 33b can occur, resulting in multiple reflections 33c, 33d, 33e at respective angles of reflection. The multiple reflections 33c, 33d, 33e or scattered light can be considered light pollution within the interior 16.

Aspects as disclosed herein can overcome the problems of light pollution within the vehicle due to reflections, TIR, and light scattering.

Figure 2:
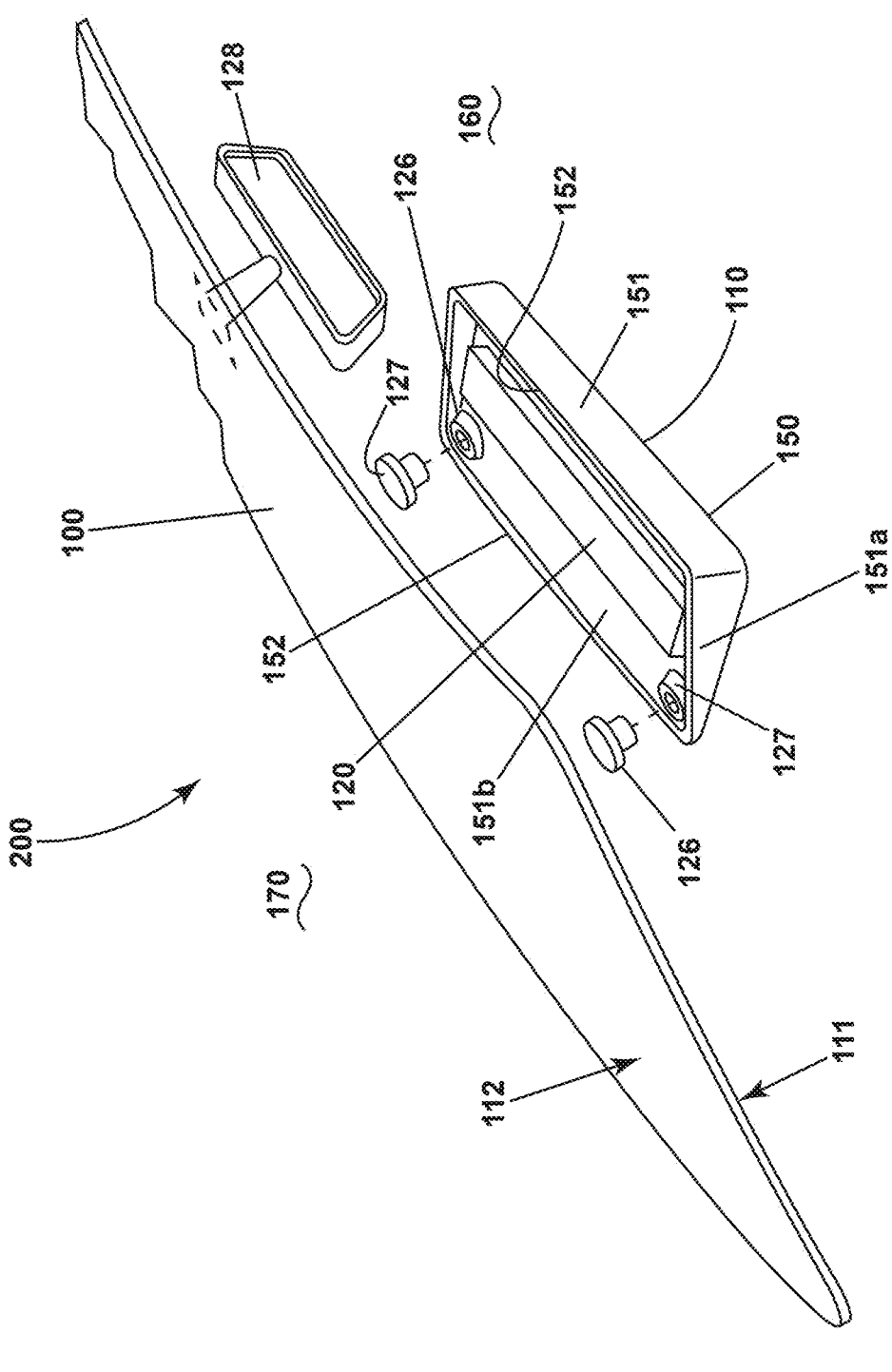
FIG. 2 is an exploded view of a lighting system, according to an aspect of the present disclosure.

FIG. 2 illustrates a lighting system 200 accordance with one non-limiting aspect. The lighting system 200 is attached to a window or panel 100, which is depicted as a windshield of a vehicle (shown in FIG. 3). While aspects will be shown and discussed herein, for brevity of description, in the context of a motor vehicle, other aspects are not so limited.

The lighting system 200 may be implemented with any type of window The panel 100 includes an inward-facing surface 111 (e.g., facing an interior 160 of the vehicle) and an opposing outward-facing surface 112 (e.g., facing an exterior 170 of the vehicle). The lighting system 200 can include a light assembly 110. The light assembly 110 can include an illumination source 120 configured to emit light. In non-limiting aspects, the light assembly 110 can include a shroud 150, at least one lighting attachment 126, and at least one attachment interface 127. The shroud can include a shroud wall 151 having a perimeter edge 152. The shroud wall 151 can include a first shroud exterior surface 151a arranged to face the vehicle interior 160, and an opposing shroud interior surface 151b arranged to face the illumination source 120. In non-limiting aspects at least a portion of the shroud wall 151 can be opaque.

In non-limiting aspects, the at least one lighting attachment 126 can be bonded to the panel 100 in conjunction with an adhesive. Any suitable adhesive may be utilized, including for example acrylic acid and methacrylate such as found in Permatex® rearview mirror adhesive conventionally used for attachment of a rearview mirror 128 to the panel 100. The adhesive or bonding agent can be configured to provide an attachment to the panel 100 that can endure in accordance with environmental exposure specifications, such as ISO-16750-4. In other non-limiting aspects, a suction device or suction cup (not shown) can be removably coupled to the panel 100, for example via establishment of a vacuum between the suction cup and the panel 100.

At least one lighting attachment 126 can be configured to removably connect to the light assembly 110. In this way, the light assembly 110 can be removably attached to the panel 100. In other non-limiting aspects, the at least one lighting attachment 126 can be a carrier that can be molded to an inward-facing surface 111 of the panel 100. The at least one lighting attachment 126 in such an aspect can include the shroud 150 that substantially directs light toward an exterior of the vehicle. As used here, an "exterior" of the vehicle is used to denote, generally, an external environment of the vehicle or an exterior to the vehicle, such as in front of the vehicle, or another direction away from the vehicle, as opposed to an "exterior surface" of the vehicle. However, non-limiting aspects of the disclosure can also be used to at least partially illuminate an exterior surface of the vehicle, the use of "exterior of the vehicle" conveys the differences between an illuminating an interior of the vehicle and illuminating any such objects outside of the vehicle. The at least one lighting attachment 126 can be configured to removably accept the light assembly 110.

In the non-limiting aspect shown, the light assembly 110 is removably attached to two lighting attachments 126 bonded to the panel 100. The lighting assembly 110 in the illustrated example is shown disposed in proximity to the left or driver-side of a vehicle, but it should be understood that the lighting assembly 110 may form a light bar disposed across both the driver side and passenger side of the vehicle. Alternatively, the lighting system 200 may be implemented internally or in the vehicle cabin in conjunction with a side window of a vehicle, which can be tinted.

At least one lighting attachment 126 can form a mountable mechanical feature on the panel 100, for attaching the light assembly 110 thereto. The attachment interface 127 is configured to enable attachment of the lighting assembly 110 to the at least one lighting attachment 126. In non-limiting aspects, the attachment interface 127 can be formed integral to the shroud 150. The attachment interface 127 can include a release mechanism (not shown) that facilitates attachment and removal of the attachment interface 127 to the lighting attachment 126. In one example, the release mechanism may enable attachment of the lighting assembly 110 in a concealed manner such that the shroud 150 conceals the attachment interface 127 and the lighting attachment 126. The lighting assembly 110 may include one or more attachment interfaces 127 configured to attach respectively to one or more lighting attachments 126, which can be bonded to the panel 100.

In non-limiting aspects, the perimeter edge 152 of the shroud 150 can substantially contacts interior portions of the vehicle interior 160 about the perimeter. For example, in some aspects, a first portion of the perimeter edge 152 can contact the panel 100 while a second portion of the perimeter edge 152 can contact structural or aesthetic aspects of the vehicle, such as a roof or a headliner (not shown) of the vehicle. Contact between the perimeter edge 152 and interior portions of the vehicle (e.g., the panel 100, structural aspects, or aesthetic aspects, or a combination thereof) can substantially prevent or reduce leakage of light from the illumination source 120 into the vehicle interior 160.

In operation, the illumination source 120 is configured to emit a light output. The light output can include visible light, non-visible light or both. The illumination source 120 can include, for example, light emitting diodes (LEDs) or incandescent lamps whose construction may vary depending on the application. For instance, the LEDs may be configured to a particular lumen output range and/or a particular color or set of colors. The illumination source 120 of the lighting assembly 110 can be selectively activated, and may include driver circuitry (not shown) capable of directing or controlling operation of the illumination source 120 in response to an external input (e.g., a discrete input or message communicated from an external source). In some aspects, the shroud 150 can be configured to facilitate heat dissipation from the illumination source 120.

Figure 3B:
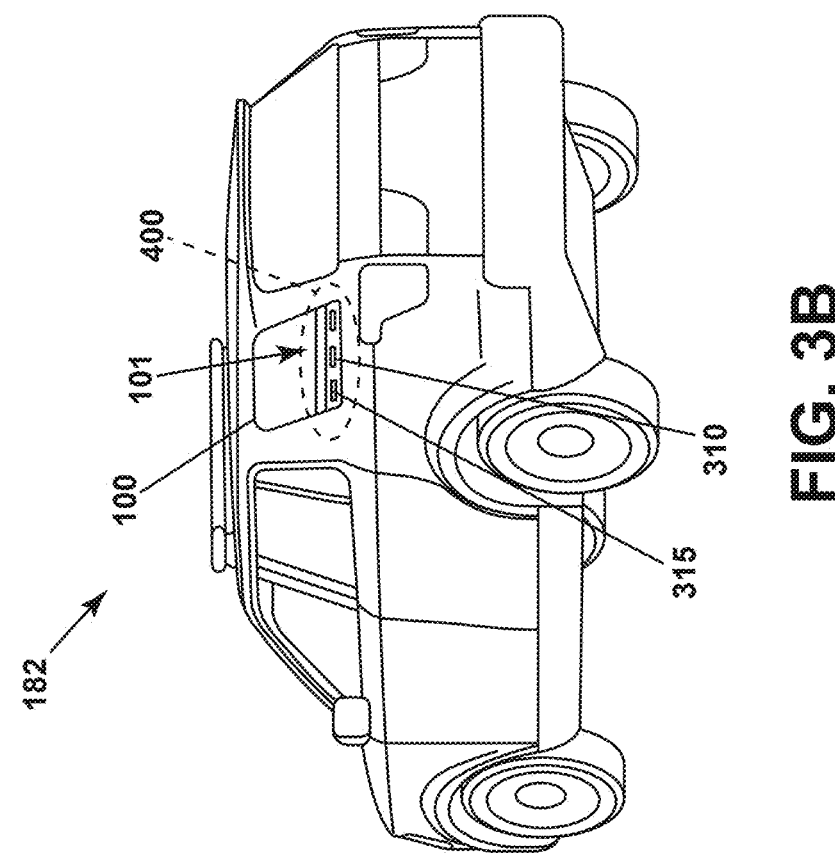
FIG. 3B is a perspective view of another specialty vehicle having a lighting system according to another aspect of the present disclosure.
Figure 3A:
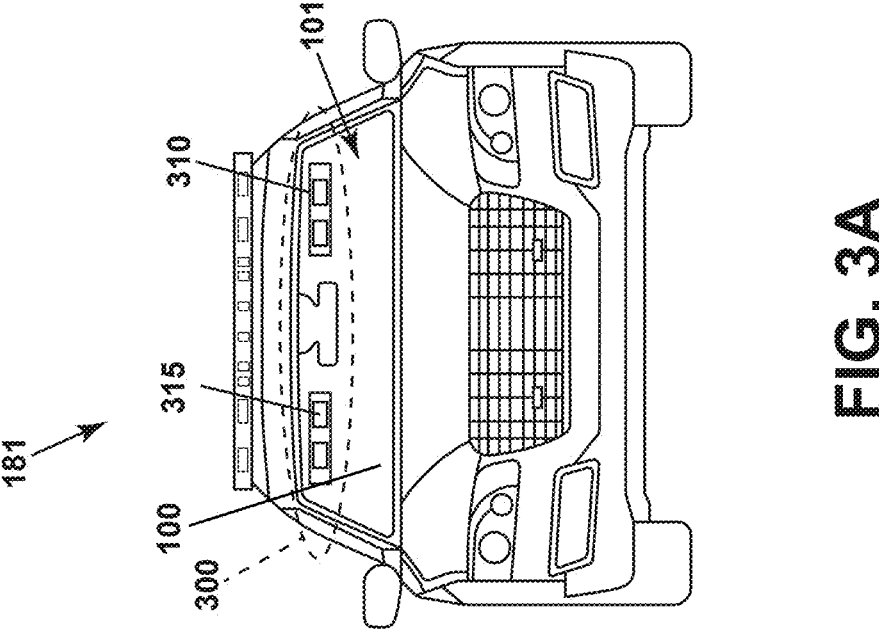
FIG. 3A is a front view of a specialty vehicle having a lighting system, according to an aspect of the present disclosure.

FIG. 3A depicts an isometric front view of a vehicle 181 having a non-limiting aspect of the lighting system 300. FIG. 3B depicts a perspective rear view of another vehicle 181 having another non-limiting aspect of the lighting system 400. With simultaneous reference to FIGS. 3A-3B, the panel 100 includes at least a first substrate layer 101 and a mask layer 310 can be applied to or incorporated into the first substrate layer 101. The first substrate layer 101 can include any type of window for any type of application, including transparent or translucent glass, including but not limited to laminated safety glass. For example, the aspect depicted in FIG. 3A, the panel 100 is a windshield of the vehicle 181, while in the aspect of FIG. 3B the panel 100 is a side window of the vehicle 182.

As used herein, "at least a first substrate layer" can include a multi-layered arrangement or assembly layers that can include, but are not limited to, glass, epoxy, laminate, lamination or laminated layers, adhesives, or other intervening layers between or adjacent to the identified substrate layers, or additional subsequent substrates in the optical path of the illumination. Non-limiting examples of multi-layer glass, as used herein, can include vehicle glass, non-glass layers or components, windows, windshields, ballistic glass, clear polycarbonate, acrylic, a combination thereof, or the like. In another non-limiting example, a "single" identified substrate layer (e.g. a first substrate layer being a single identified substrate layer, a second substrate layer being a single identified substrate layer, etc.) can include a multi-layered arrangement or assembly. In this example, the first substrate layer may include a set of layers that can include, but are not limited to, glass, epoxy, laminate, lamination or laminated layers, adhesives, or other intervening layers between or adjacent to the first substrate layer.

In this sense, the substrate layers described herein can each include multiple layers, and different or dissimilar substrate layers can include a similar or different multi-layer composition, arrangement, or assembly, and sub-composition layers may not be described herein for brevity and understanding. Additionally, other interface layer options are envisioned, such as included within a single layer of a substrate, between multi-layered substrates, or at an external surface (external being relative to the substrate). It will be understood that while multi-layered substrates are described, a single substrate or any number of multi-layered substrates can be included in aspects of the disclosure.

The mask layer 310 can define one or more apertures 315 arranged in registry or aligned with one or more light assemblies 110 (shown in FIG. 2) to enable transmission of a portion of a light output 121 (shown in FIG. 4) emitted from the one or more light assemblies 110. The mask layer 310 can be further positioned with respect to the one or more light assemblies 110 to absorb another portion of the light output 121. In non-limiting aspects, the mask layer 310 may be constructed of frit or a ceramic material or the like, defining light-absorbing properties, and bonded or applied to the panel 100. In non-limiting examples, the mask or mask layer 310 described herein can include light-absorbing properties defined by characteristics, compositions, or the like, whereby at least a portion of illumination or light emissions that reach the mask layer 310 are absorbed and not reflected or re-emitted from the mask layer 310. For instance, the mask layer 310 can comprise compositions or materials that are opaque, semi-opaque, semi-transparent, tinted, pigmented, doped, or the like, such that at least some light emissions that reach the mask layer 310 are absorbed.

Figure 4:
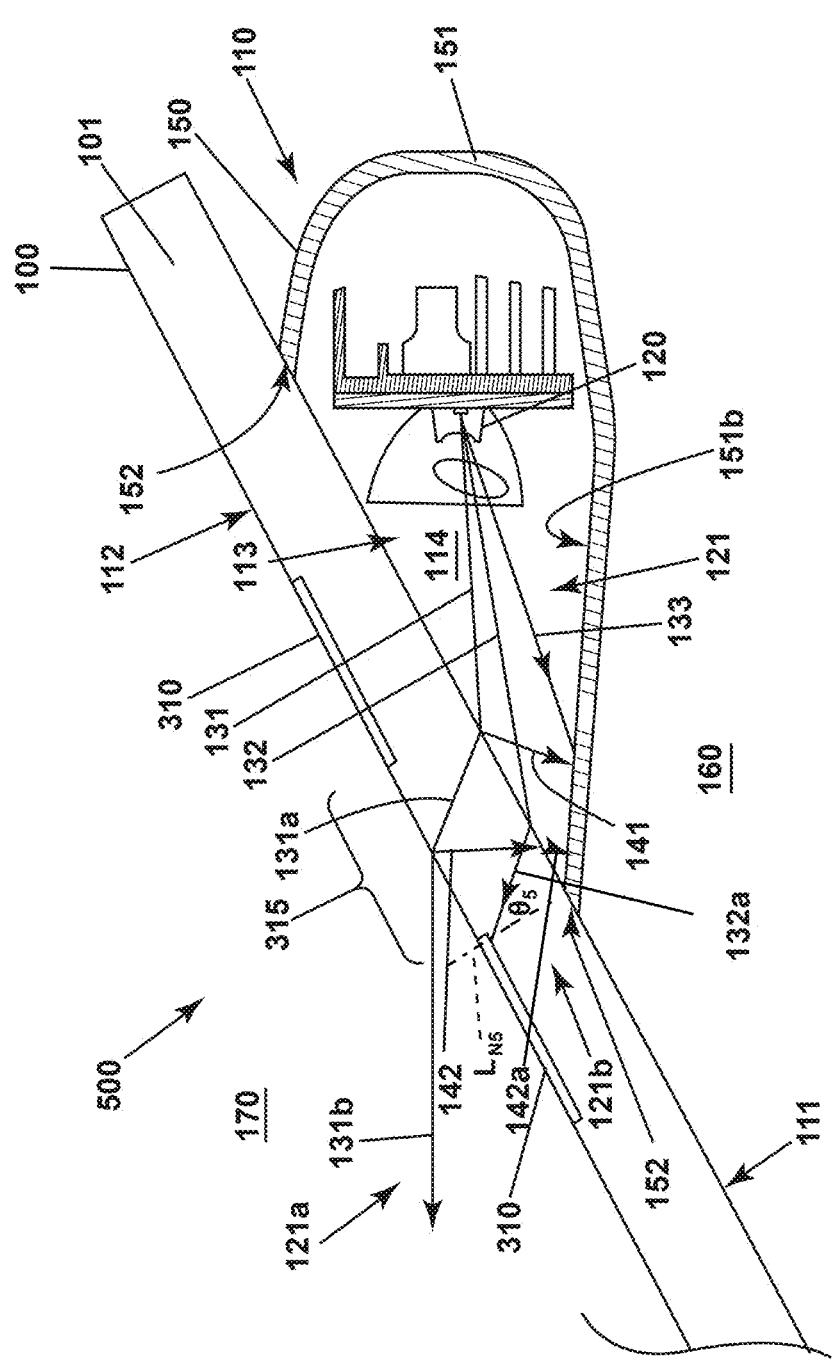
FIG. 4 is a schematic diagram of another exemplary aspect of a lighting system for a vehicle, according to an aspect of the present disclosure.

FIG. 4 is a schematic diagram illustrating another non-limiting aspect of the lighting system 500 for a vehicle, such as the vehicle 181, 182 (shown in FIGS. 3A-3B) with the lighting attachment 126 and attachment interface 127 omitted for clarity. The lighting system 500 includes the illumination source 120 disposed within the vehicle interior 160 configured to provide a light output 121 illustrated, for brevity of description as a set of arrows indicative of a bundle of light rays 131, 132, 133. The light output 121 is directed toward the panel 100 to pass therethrough to illuminate a space or a target exterior 170 of or external to the vehicle.

The panel 100 includes the inward-facing surface 111 (e.g., facing the vehicle interior 160) and an opposing outward-facing surface 112 (e.g., facing the exterior 170). The inward-facing surface 111 faces the illumination source 120. The inward-facing surface 111 is disposed between the illumination source 120 and the outer-facing surface 112 with the outward-facing surface 112 in contact with air 114 at the exterior 170. The illumination source 120 can be spaced from the inward-facing surface 111, to define a gap 113 therebetween. Air 114 (or another material) can be disposed in the gap 113. In non-limiting aspects, the material (e.g., glass) used to form first substrate layer 101, can have a first refractive index $N_1$ that differs (e.g., is greater than) from a second refractive index $N_2$ of the air 114 disposed in the gap 113 and at the exterior 170 of the vehicle. For example, material used to form the first substrate layer 101 can have a first refractive index $N_1$ of 1.518, and the air 114 can have a second refractive index $N_2$ of 1.003.

In non-limiting aspects, the mask layer 310 can be disposed at the first substrate layer 101. As used herein, "disposed at" can include aspects of the disclosure where the mask layer 310 is disposed adjacent to a substrate layer, disposed internally with a substrate layer, disposed on top of a surface of a substrate layer, including partially or entirely disposed relative to the substrate layer, or the like. As shown, in one non-limiting example, the mask layer 310 can be applied or incorporated at or on the outward-facing surface 112 of the first substrate layer 101. As illustrated, the mask layer 310 can define the aperture 315 in registry or aligned with the illumination source 120 to enable transmission of a portion of the light output 121 as a beam therethrough. While the mask layer 310 is illustrated in FIG. 4, and described as applied or incorporated at or on the outward-facing surface 112, non-limiting aspects of the disclosure can be included where the mask layer 310 can be included or incorporated into one or more sub-composition layers or laminations, such that the mask layer 310 can be "internal" to the respective substrate it is described with reference to. In this sense, it is envisioned the mask layer 310 may not be disposed or positioned on or at a surface, interface, or the like, of a substrate, but may be included as a portion of a sub-layer of the substrate.

Additionally, or alternatively, individual sub-composition layers may not include a consistent composition or thickness of the substrate. For instance, the mask layer 310 may be included within an internal dimension of the at least one substrate layer (shown as the first substrate 101), or squeezed, pressed, laminated, or the like, with additional non-mask compositions (such as epoxy, adhesive, or the like), such that the overall thickness of the at least one substrate layer is consistent along the panel 100. In yet another non-limiting aspect, while figures of the current disclosure can include schematic representation where a flush surface is shown between the mask layer and a surface of a respective substrate, aspects of the disclosure can be included wherein the mask layer 310 and another respective surface are not flush, or include topography or topographical differences (including but not limited to elevation differences between boundaries).

In non-limiting aspects, the shroud wall 151 can at least partially circumscribe or enclose the light output 121 (e.g., the bundle of light rays 131, 132, 133). In non-limiting aspects, the perimeter edge 152 can substantially contact the inward-facing surface 111 of the panel 100. The shroud wall 151 can be at least partially opaque. The shroud interior surface 151b can be arranged to face the illumination source 120 or light output 121. In non-limiting aspects the shroud interior surface 151b can define light-absorbing properties.

In operation, the illumination source 120 can provide a light output 121 illustrated as the bundle of light rays 131, 132, 133. The light rays 131, 132, 133 are directed from the vehicle interior 160 toward the inward-facing surface 111 the panel 100. A first portion 121a of the light output 121 can project from the panel 100 (e.g., as emergent light), while a second portion 121b of the light output 121 can be reflected or refracted by the panel 100.

The first incident ray 131 can be projected from the illumination source 120 through the air 114 in the gap 113 toward the panel 100. When the first incident ray 131 strikes the inward-facing surface 111 the first incident ray 131 will travel through the panel 100 to define a first internal portion 131a of the first incident ray 131. The first internal portion 131a of the first incident ray 131 will travel through the first substrate layer 101 and reach the boundary between outward-facing surface 112. In the event that the first internal portion 131a of the first incident ray 131 strikes the outward-facing surface 112 within the aperture 315, it will exit the panel 100 and travel through the air 114 at the exterior 170 of the vehicle as a first emergent portion 131*b* of the first incident ray 131.

Additionally, the first incident ray 131 can further result in a specular component or first Fresnel reflection 141. The first Fresnel reflection 141 can reflect from the inward-facing surface 111 toward the vehicle interior 160. However, as illustrated, the shroud wall 151 can be positioned and configured to block the first Fresnel reflection 141 from proceeding into the vehicle interior 160 (e.g., into the cabin). For example, in non-limiting aspects, the shroud interior surface 151*b* can define light-absorbing properties and can operatively absorb the first Fresnel reflection 141 to substantially prevent the reflected light from illuminating the vehicle interior 160 and thereby reduce light pollution in the vehicle interior 160 that would otherwise occur in the absence of the shroud wall 151. In other non-limiting aspects, the shroud interior surface 151*b* can be reflective and can be configured to reflect the first Fresnel reflection 141 toward the aperture 315.

Additionally, when the first internal portion 131*a* of the first incident ray 131 strikes the outward-facing surface 112 within the aperture 315, based on the law of reflection, a second Fresnel reflection 142 can reflect from the boundary between the panel 100 and the air 114 at the outward-facing surface 112 toward the vehicle interior 160.

The second Fresnel reflection 142 will travel through the panel 100 toward the vehicle interior 160 and reach the boundary between the panel 100 and the air 114 at the inward-facing surface 111. The second Fresnel reflection 142 will enter the air 114 in the gap 113 to define a first external portion 142*a* of the second Fresnel reflection 142.

However, as illustrated, the shroud wall 151 can be positioned and configured to block the second Fresnel reflection 142 from proceeding into the vehicle interior 160 (e.g., into the cabin). For example, in non-limiting aspects, the shroud interior surface 151*b* can define light-absorbing properties and can operatively absorb a first external portion 142*a* of the second Fresnel reflection 142 to substantially prevent the reflected light from illuminating the vehicle interior 160 and thereby reduce light pollution within the vehicle interior 160. In other non-limiting aspects, the shroud interior surface 151*b* can be reflective and can be configured to reflect the first external portion 142*a* of the second Fresnel reflection 142 toward the aperture 315.

A second portion of the light output 121, illustrated as a second incident ray 132 can be projected from the illumination source 120 toward the inward-facing surface 111 through the air 114. When the second incident ray 132 strikes the inward-facing surface 111, it will travel through the panel 100 toward the exterior 170 to define a second internal portion 132*a* of the second incident ray 132. The second internal portion 132*a* of the second incident ray 132 will travel through the panel 100 and reach the boundary between the panel 100 and the air 114 at the outward-facing surface 112. The fifth angle of incidence $\theta_5$ can be defined between the second incident ray 132 and the fifth normal line $L_{N5}$ to the outward-facing surface 112. The fifth angle of incidence $\theta_5$ can be equal to or greater than a critical angle resulting in a TIR (e.g., with no refracted ray)

Advantageously, the mask layer 310 applied or incorporated at or on the outward-facing surface 112 of the first substrate layer 101 can absorb the second internal portion 132*a* of the second incident ray 132. In this way, the mask layer 310 is configured to prevent a TIR and consequent "trapped" light of the second internal portion 132*a* of the second incident ray 132 that would otherwise occur in the absence of the mask layer 310.

The third incident ray 133 can be projected from the illumination source 120 through the air 114 at an angle that would prevent the third incident ray 133 from projecting through the aperture 315. However, as illustrated, the shroud wall 151 can be positioned and configured to block the third incident ray 133 from proceeding into the vehicle interior 160 (e.g., into the cabin) to substantially prevent the reflected light from illuminating the vehicle interior 160, thereby reducing light pollution within the vehicle interior 160.

Figure 5:
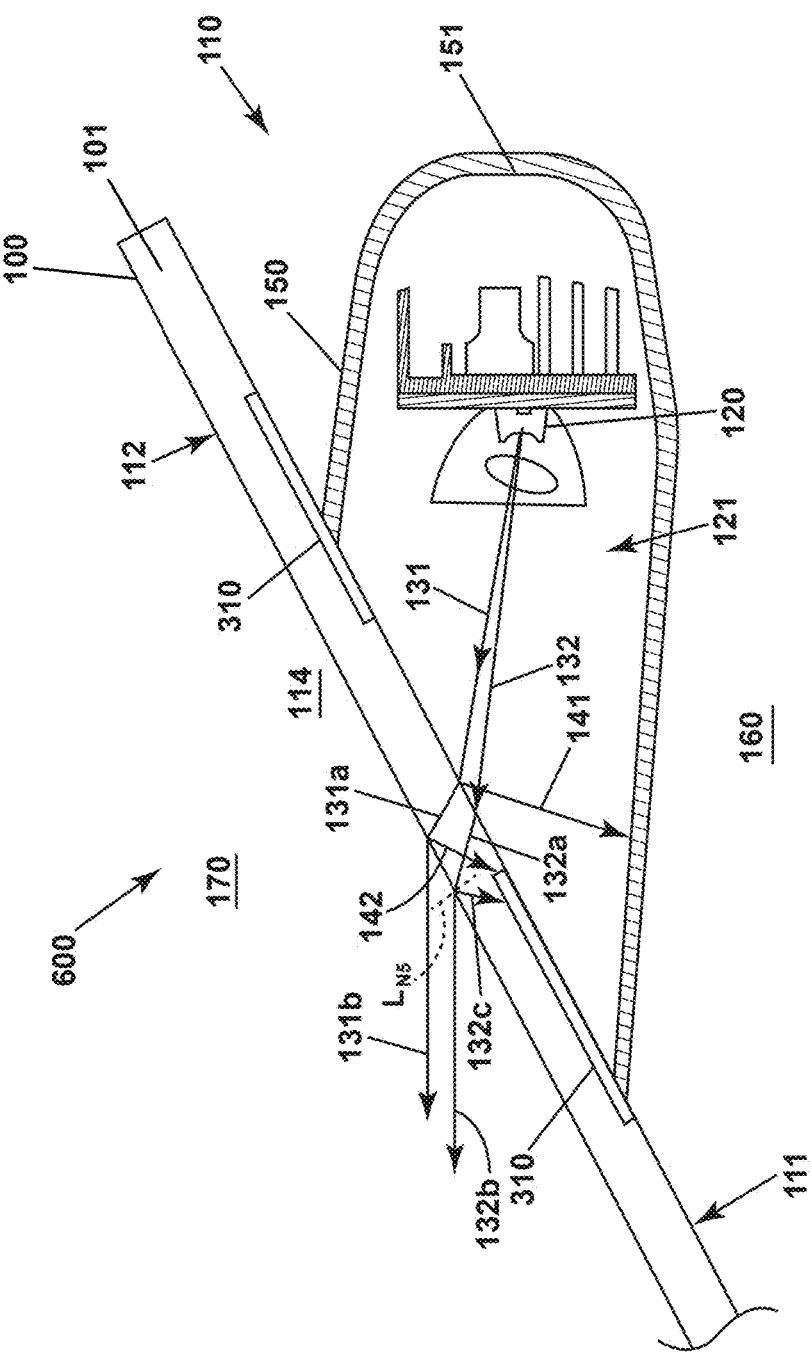
FIG. 5 is a schematic diagram of another exemplary aspect of a lighting system for a vehicle, according to an aspect of the present disclosure.

FIG. 5 is a schematic diagram illustrating another non-limiting aspect of the lighting system 600 for a vehicle, such as the vehicle 181, 182 (shown in FIGS. 3A-3B) with the lighting attachment 126 and attachment interface 127 omitted for clarity. The lighting system 600 of FIG. 5 is similar to the lighting system 500 of FIG. 4, and like parts will be referred to with like reference numbers. One notable difference between the lighting system 600 of FIG. 5 and the lighting system 500 of FIG. 4 is that the lighting system 600 has the mask layer 310 applied or incorporated at or on the inward-facing surface 111 of the first substrate layer 101. Another notable difference is that the lighting system 600 of FIG. 5, the shroud 150 is coupled to the first surface inward-facing surface 111 along at least a portion of the mask layer 310.

The lighting system 600 includes the illumination source 120 disposed within the vehicle interior 160 configured to provide the light output 121 illustrated as the set of arrows indicative of the bundle of light rays 131, 132. The light output 121 is directed from the vehicle interior 160 toward the panel 100 to pass therethrough to illuminate the exterior 170. The first portion 121*a* of the light output 121 can project from the panel 100 (e.g., as emergent light) while the second portion 121*b* of the light output 121 can be reflected or refracted by the panel 100.

In operation, the first incident ray 131 can be projected from the illumination source 120 through the air 114 toward the panel 100. When the first incident ray 131 strikes the inward-facing surface 111, it will be refracted through the panel 100 to define the first internal portion 131*a* of the first incident ray 131. The first internal portion 131*a* of the first incident ray 131 will travel through the panel 100 and after reaching the outward-facing surface 112 within the aperture 315, it will travel through the air 114 as the first emergent portion 131*b* of the first incident ray 131 at the exterior 170.

Additionally, after reaching the outward-facing surface 112, the first incident ray 131 can further result in the first Fresnel reflection 141 reflected from the inward-facing surface 111. However, as illustrated, the shroud wall 151 can be positioned and configured to block or absorb the first Fresnel reflection 141 from proceeding into the vehicle interior 160 (e.g., into the cabin) thereby reducing light pollution within the vehicle interior 160.

Additionally, when the first internal portion 131*a* of the first incident ray 131 strikes the outward-facing surface 112 within the aperture 315, the second Fresnel reflection 142 can reflect from the boundary between the panel 100 and the air 114 at the outward-facing surface 112. However, as illustrated, the mask layer 310 can be positioned and configured to absorb or block the second Fresnel reflection 142 from proceeding from the panel 100 toward the vehicle interior 160, thereby reducing light pollution within the vehicle interior 160.

The second portion of the light output 121, illustrated as the second incident ray 132 can be projected from the illumination source 120 through the air 114 (e.g., having the second refractive index N2) toward the panel 100 (e.g., having the first refractive index N1). When the second incident ray 132 strikes the inward-facing surface 111, it will travel through the panel 100 to define the second internal portion 132a of the second incident ray 132.

The second internal portion 132a of the second incident ray 132 will travel through the panel 100 and after reaching the outward-facing surface 112 within the aperture 315, it will travel through the air 114 as the second emergent portion 132b of the second incident ray 132 at the exterior 170.

Additionally, when the second internal portion 132a of the second incident ray 132 reaches the boundary between the panel 100 and the air 114 at the outward-facing surface 112, the fifth angle of incidence $\theta_5$ can be defined with respect to the fifth normal line $L_{N5}$ to the outward-facing surface 112. When the fifth angle of incidence $\theta_5$ is not a critical angle, the second internal portion 132a would then be reflected back through the panel 100 as a third internal portion 132c of the second incident ray 132, and would otherwise proceed into the vehicle interior 160, However, in various aspects, the mask layer 310 can be applied or incorporated at or on the inward-facing surface 111 of the first substrate layer 101 and positioned to absorb the third internal portion 132c (e.g., a reflected portion) of the second incident ray 132. In this way, the mask layer 310 is configured to prevent the third internal portion 132c from proceeding into the vehicle interior 160 (e.g., into the cabin), thereby reducing light pollution within the vehicle interior 160.

Additionally, or alternatively, in the event the fifth angle of incidence $\theta_5$ is equal to or greater than a critical angle, the second internal portion 132a of the second incident ray 132 would result in a TIR and consequent "trapped" light of the second internal portion 132a. However, the mask layer 310 can be positioned to absorb the second internal portion 132a of the second incident ray 132. In this way, the mask layer 310 is configured to prevent the TIR of the second internal portion 132a of the second incident ray 132 that would otherwise occur in the absence of the mask layer 310, thereby reducing light pollution within the vehicle interior 160.

Figure 6:
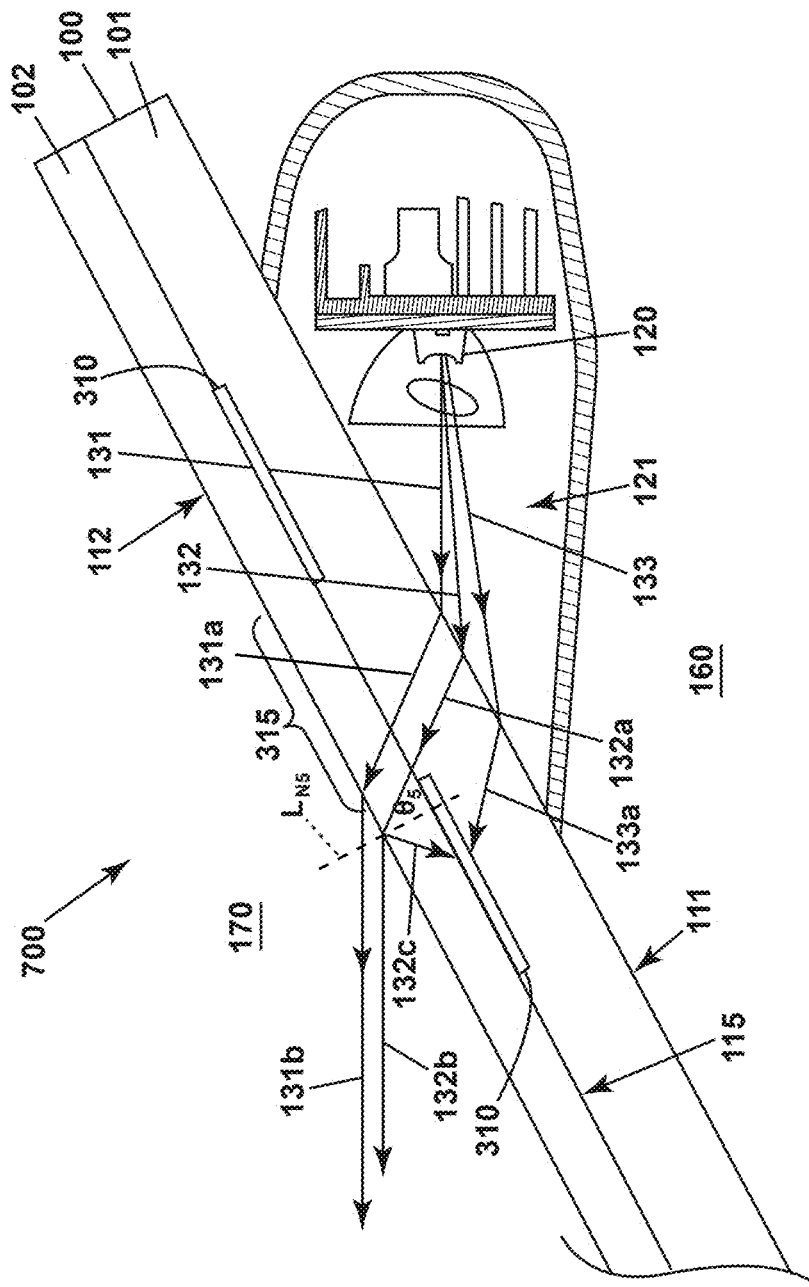
FIG. 6 is a schematic diagram of another exemplary aspect of a lighting system for a vehicle according to another aspect of the present disclosure.

FIG. 6 is a schematic diagram illustrating another non-limiting aspect of the lighting system 700 for a vehicle, such as the vehicle 181, 182 (shown in FIGS. 3A-3B) with the lighting attachment 126 and attachment interface 127 omitted for clarity. The lighting system 700 of FIG. 6 is similar to the lighting system 500 of FIG. 4, and like parts will be referred to with like reference numbers. One notable difference between the lighting system 700 of FIG. 6 and the lighting system 500 of FIG. 4 is that the panel 100 of the lighting system 700 further includes a second substrate layer 102. Another notable difference is that the lighting system 700 of FIG. 6, includes the mask layer 310 disposed between the first substrate layer 101 and the second substrate layer 102.

The first substrate layer 101 or the second substrate layer 102, or both can include any type of window for any type of application, including transparent or translucent glass, including but not limited to laminated safety glass for a vehicle. The second substrate layer 102 can face the first substrate layer 101 along an interface 115. In this way, the first substrate layer 101 defines the inward-facing surface 111 (e.g., facing the vehicle interior 160) and the second substrate layer 102 defines the opposing outward-facing surface 112 (e.g., facing the exterior 170), with the interface 115 disposed therebetween. The mask layer 310 can be applied or incorporated along the interface 115, for example on or into the first substrate layer 101, or the second substrate layer 102, or both.

The lighting system 700 includes the illumination source 120 disposed within the vehicle interior 160 configured to provide the light output 121 illustrated as the set of arrows indicative of the bundle of light rays 131, 132, 133. The light output 121 is directed from the vehicle interior 160 toward the panel 100 to pass therethrough to illuminate the exterior 170. The first portion 132c of the light output 121 can project from the panel 100 (e.g., as emergent light) while the second portion 132c of the light output 121 can be reflected or refracted by the panel 100.

As illustrated in FIG. 6, in operation the first incident ray 131 can be projected from the illumination source 120 through the air 114 toward the panel 100. When the first incident ray 131 strikes the inward-facing surface 111, it will travel through the panel 100 in accordance with Snell's law to define the first internal portion 131a of the first incident ray 131. The first internal portion 131a of the first incident ray 131 will travel through the first substrate layer 101 and after reaching the outward-facing surface 112 within the aperture 315, it will travel through the air 114 as the first emergent portion 131b of the first incident ray 131 at the exterior 170 of the vehicle.

The second incident ray 132 can be projected from the illumination source 120 through the air 114 toward the panel 100. When the second incident ray 132 strikes the inward-facing surface 111, it will travel through the panel 100 to define the second internal portion 132a of the second incident ray 132. The second internal portion 132a of the second incident ray 132 will travel through the panel 100 and after reaching the outward-facing surface 112 within the aperture 315, it will travel through the air 114 as the second emergent portion 132b of the second incident ray 132 at the exterior 170 of the vehicle.

Additionally, when the second internal portion 132a of the second incident ray 132 reaches the boundary between the panel 100 and the air 114 at the outward-facing surface 112, the fifth angle of incidence $\theta_5$ can be defined with respect to the fifth normal line $L_{N5}$ to the outward-facing surface 112. When the fifth angle of incidence $\theta_5$ is not a critical angle, the second internal portion 132a would then be reflected back through the panel 100 as the third internal portion 132c of the second incident ray 132, and otherwise proceed into the vehicle interior 160. However, in various aspects, the mask layer 310 can be applied or incorporated at the interface 115 between the first substrate layer 101 and the second substrate layer 102, and further positioned to absorb the third internal portion 132c of the second incident ray 132. In this way, the mask layer 310 is configured to prevent the third internal portion 132c from proceeding into the vehicle interior 160 (e.g., into the cabin) thereby reducing light pollution within the vehicle interior 160.

Additionally, or alternatively, in the event the fifth angle of incidence $\theta_5$ is equal to or greater than a critical angle, the second internal portion 132a of the second incident ray 132 would result in a TIR and consequent "trapped" light of the third internal portion 132c. However, the mask layer 310 can be positioned to absorb the third internal portion 132c of the second incident ray 132. In this way, the mask layer 310 is configured to prevent the TIR of the third internal portion 132c of the second incident ray 132 that would otherwise occur in the absence of the mask layer 310, thereby reducing light pollution within the vehicle interior 160.

A third portion of the light output 121, illustrated as a third incident ray 133 can also be projected from the illumination source 120 through the air 114. When the third incident ray 133 strikes the inward-facing surface 111, it will travel through the panel 100 in accordance with Snell's law to define a third internal portion 133*a* of the third incident ray 133.

The third internal portion 133*a* would, after reaching the outward-facing surface 112, exit the panel 100 as an emergent portion of the third incident ray 133. However, as illustrated, this emergent portion of the third incident ray 133 would otherwise project outside of the aperture 315 defined by the mask layer 310, and thus be undesirable. Accordingly, the mask layer 310 can be positioned along a portion of the interface 115 to absorb the third internal portion 133*a* of the third incident ray 133. In this way, the mask layer 310 is configured to prevent light rays that diverge from a predetermined beam pattern from projecting from the panel 100 that would otherwise occur in the absence of the mask layer 310.

Figure 7:
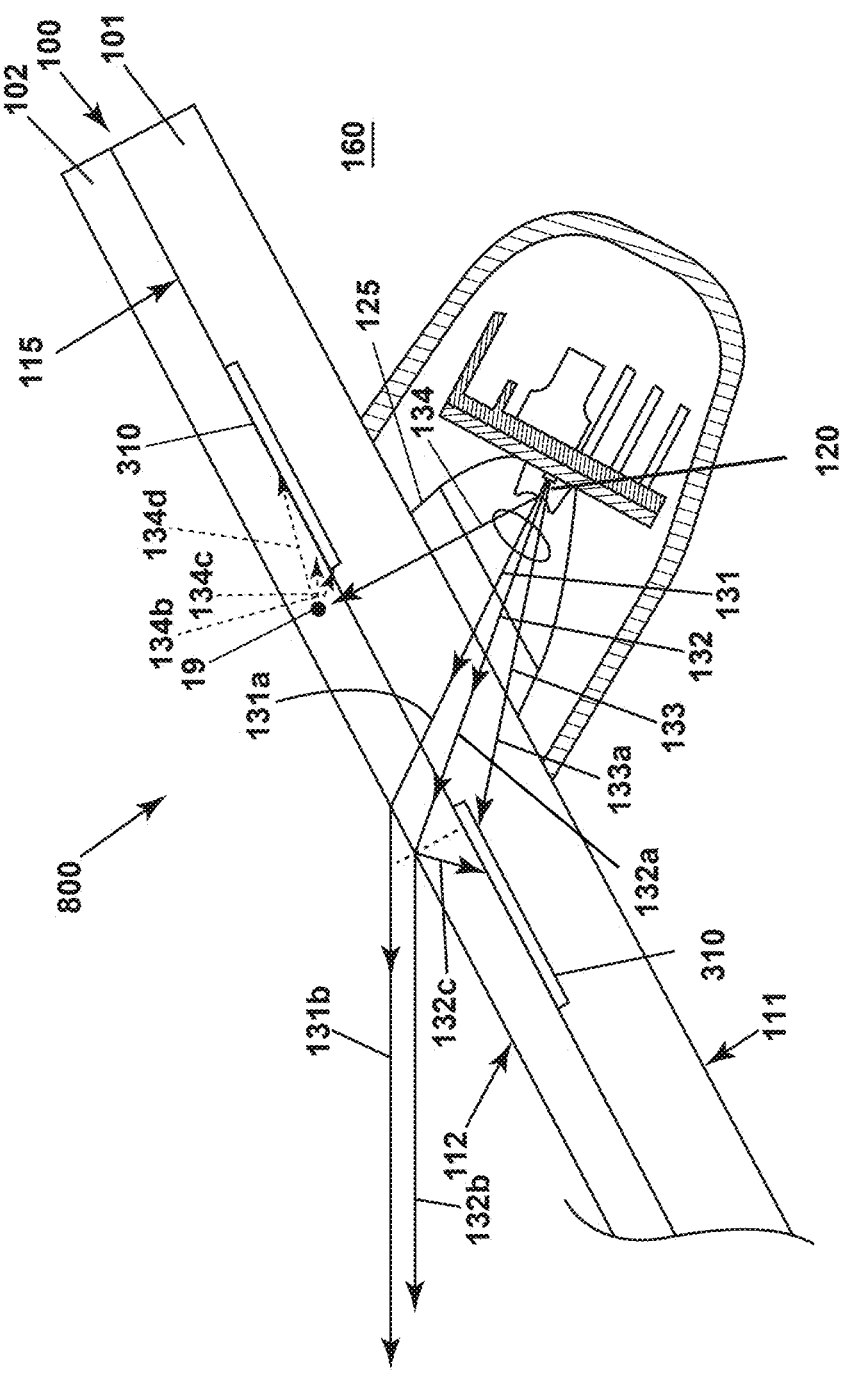
FIG. 7 is a schematic diagram of another exemplary aspect of a lighting system for a vehicle according to another aspect of the present disclosure.

FIG. 7 is a schematic diagram illustrating another non-limiting aspect of the lighting system 800 for a vehicle, such as the vehicle 181, 182 (shown in FIGS. 3A-3B) with the lighting attachment 126 and attachment interface 127 omitted for clarity. The lighting system 800 of FIG. 7 is similar to the lighting system 700 of FIG. 6, and like parts will be referred to with like reference numbers. One notable difference between the lighting system 800 of FIG. 7 and the lighting system 700 of FIG. 6 is that the illumination source 120 of the lighting system 800 includes a translucent lens 125 (e.g., a glass lens) that can be coupled directly to the inward-facing surface 111 of the panel 100, such that the gap 113 (shown in FIG. 4) is eliminated.

Non-limiting aspects of the disclosure can be included with or without a translucent lens 125, as described herein. While some illustrations may include or may exclude the lens 125, it is envisioned that aspects of the disclosure are applicable regardless of the inclusion or exclusion of the lens 125, or an inclusions of a partial lens 125 and partial air gap (such as air gap 113 in FIG. 4) In non-limiting aspects, the lens can have a refractive index that is substantially the same as the refractive index of the panel 100. Another difference is that the aspect of FIG. 7 is depicted with an irregularity 19 within the second substrate layer 102.

Non-limiting aspects of the disclosure can be included wherein the lighting system 200, 500, 600, 700, 800 includes the lens 125 is positioned at least partially in the optical pathway of the illumination bundle of rays 131, 132, 133 and can be configured to operably allow for an optical translation between the light output 121 and the panel 100. For instance, the lens 125 can be configured as an optical translator and disposed in continuous communication with both the inward-facing surface 111 of the first substrate layer 101. In another non-limiting aspect of the disclosure, the lens 125 can be configured as an optical translator and disposed in at least one point of optical contact or communication with both the inward-facing surface 111 of the first substrate layer 101. In yet another non-limiting aspect of the disclosure, the lens 125 may be optional or not included at all. Non-limiting aspects of the disclosure can be included wherein the lens 125 operably allows for or enables establishing a physical distance reference from the inward-facing surface 111 of the first substrate layer 101. For instance, and for understanding, in non-limiting aspects where the inward-facing surface 111 represents a datum (or datum optic, referring to a feature on an optical component that serves as a reference point for alignment, measurement, geometric control, or the like), the lens 125 (in any arrangement or configuration) allows for or enables a predetermined optical distance of the illumination source 120 with reference to the datum or the inward-facing surface 111.

The lighting system 800 includes the illumination source 120 disposed within the vehicle interior 160 configured to provide the light output 121 illustrated as the set of arrows indicative of the bundle of light rays 131, 132, 133, 134. The light output 121 is directed from the vehicle interior 160 toward the panel 100 to pass therethrough to illuminate the exterior 170. The first portion 132*b* of the light output 121 can project from the panel 100 (e.g., as emergent light) while the second portion 132*c* of the light output 121 can be reflected or refracted by the panel 100.

As illustrated in FIG. 7, in operation, the first incident ray 131 can be projected from the illumination source 120 through the lens toward the panel 100. When the first incident ray 131 strikes the inward-facing surface 111, it will travel through the panel 100 to define the first internal portion 131*a* of the first incident ray 131 without refraction due to the refractive index of the panel 100 and the lens 125 being substantially the same. The first internal portion 131*a* of the first incident ray 131 will travel through the first substrate layer 101 and after reaching the outward-facing surface 112 within the aperture 315, it will travel through the air 114 as the first emergent portion 131*b* of the first incident ray 131 at the exterior 170.

The second incident ray 132 can be projected from the illumination source 120 through the air 114 toward the panel 100. When the second incident ray 132 strikes the inward-facing surface 111, it will travel through the panel 100 without refracting, again due to the refractive index of the panel 100 and the lens 125 being substantially the same, to define the second internal portion 132*a* of the second incident ray 132. The second internal portion 132*a* of the second incident ray 132 will travel through the panel 100 and after reaching the outward-facing surface 112 within the aperture 315, it will travel through the air 114 as the second emergent portion 132*b* of the second incident ray 132 at the exterior 170 of the vehicle.

Regardless of whether the second internal portion 132*a* of the second incident ray 132 reaches the boundary between the panel 100 and the air 114 at the outward-facing surface 112, at a critical angle or non-critical angle, the third internal portion 132*c* of the second incident ray 132 is reflected back through the second substrate layer 102. However, in various aspects, the mask layer 310 can be applied or incorporated at the interface 115 between the first substrate layer 101 and the second substrate layer 102, and further positioned to absorb the third internal portion 132*c* of the second incident ray 132. In this way, the mask layer 310 is configured to prevent the third internal portion 132*c* from proceeding into the vehicle interior 160 (e.g., into the cabin) or to prevent the TIR of the third internal portion 132*c* of the second incident ray 132 that would otherwise occur in the absence of the mask layer 310, thereby reducing light pollution within the vehicle interior 160

The third incident ray 133 can also be projected from the illumination source 120 through the air 114. When the third incident ray 133 strikes the inward-facing surface 111, it will travel through the panel 100 without refracting, again due to the refractive index of the panel 100 and the lens 125 being substantially the same, to define the third internal portion 133*a* of the third incident ray 133.

As illustrated, the mask layer 310 can be positioned along a portion of the interface 115 to absorb the third internal portion 133*a* of the third incident ray 133. to prevent light rays that diverge from a predetermined beam pattern from projecting from the panel 100 that would otherwise occur in the absence of the mask layer 310, thereby reducing light pollution within the vehicle interior 160.

A fourth incident ray 134 can also be projected from the illumination source 120 through the lens 125, and into the panel 100 as a fourth internal portion 134a of the fourth incident ray 134. However, as illustrated, the internal portion 134a of the fourth incident ray 134 can strike the irregularity 19 disposed between the inward-facing surface 111 and the outward-facing surface 112. When the fourth internal portion 134a of the fourth incident ray 134 strikes the irregularity 19, a diffuse reflection of the fourth internal portion 134a can occur, resulting in a plurality of scatter reflections 134b, 134c, 134d at respective angles of reflection.

The mask layer 310 positioned along a portion of the interface 115 can absorb at least some of the plurality of scatter reflections 134b, 134c, 134d to prevent at least some of the plurality of scatter reflections 134b, 134c, 134d from projecting from the panel 100 into the vehicle interior that would otherwise occur in the absence of the mask layer 310, thereby reducing light pollution within the vehicle interior 160.

Figure 8:
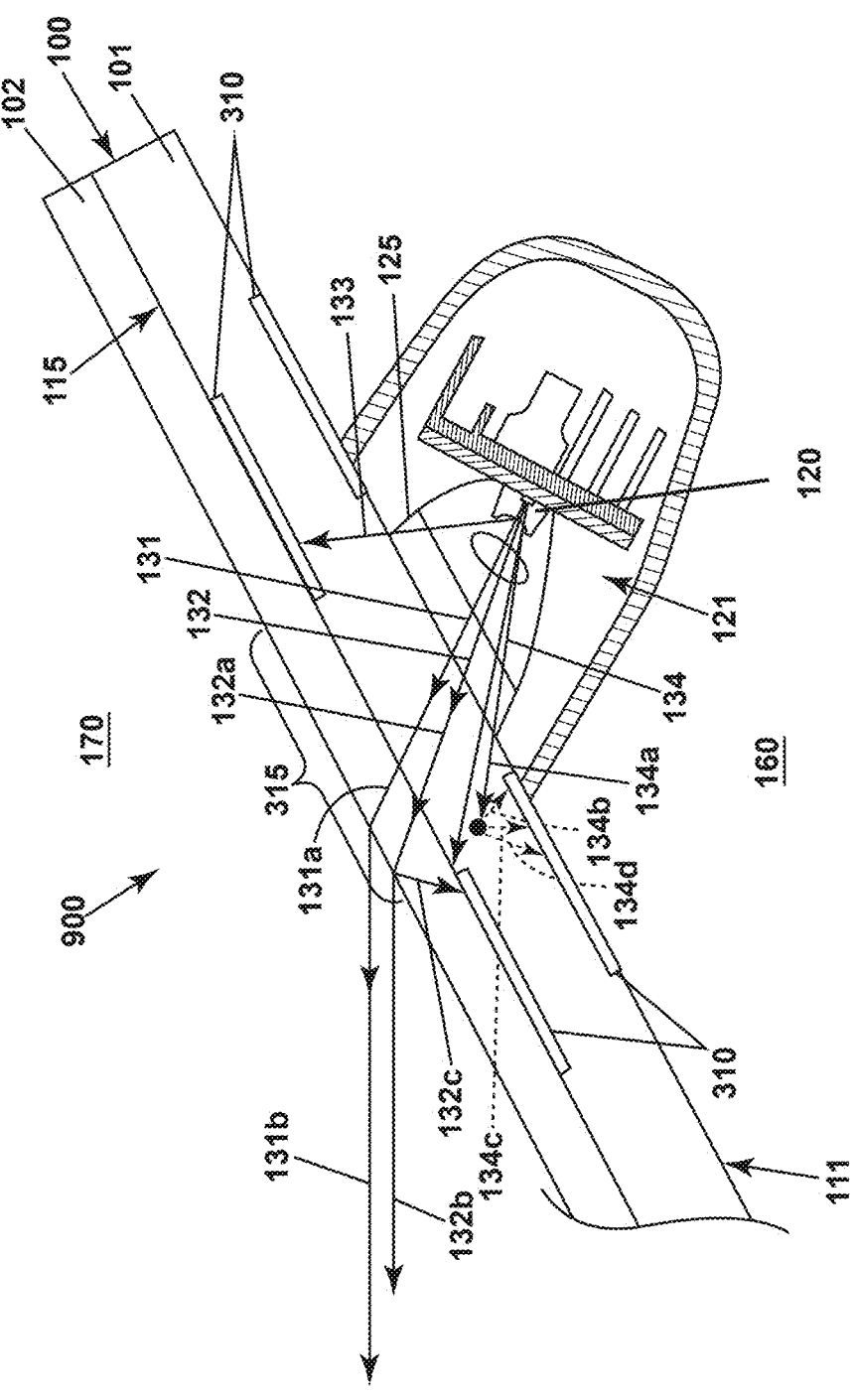
FIG. 8 is a schematic diagram of another exemplary aspect of a lighting system for a vehicle according to another aspect of the present disclosure.

FIG. 8 is a schematic diagram illustrating another non-limiting aspect of the lighting system 900 for a vehicle, such as the vehicle 181, 182 (shown in FIGS. 3A-3B) with the lighting attachment 126 and attachment interface 127 omitted for clarity. The lighting system 900 of FIG. 8 is similar to the lighting system 800 of FIG. 7, and like parts will be referred to with like reference numbers. One notable difference between the lighting system 900 of FIG. 8 and the lighting system 800 of FIG. 7 is that the mask layer 310 is applied or incorporated at or on the inward-facing surface 111 and at or on the interface between the first substrate layer and the second substrate layer 102.

The lighting system 800 includes the illumination source 120 disposed within the vehicle interior 160 configured to provide the light output 121 illustrated as the set of arrows indicative of the bundle of light rays 131, 132, 133, 134. The light output 121 is directed from the vehicle interior 160 toward the panel 100 to pass therethrough to illuminate the exterior 170. The first portion 132b of the light output 121 can project from the panel 100 (e.g., as emergent light) while the second portion 132c of the light output 121 can be reflected or refracted by the panel 100.

As illustrated in FIG. 8, in operation, the first incident ray 131 can be projected from the illumination source 120 through the lens toward the panel 100. When the first incident ray 131 strikes the inward-facing surface 111, it will travel through the panel 100 to define the first internal portion 131a of the first incident ray 131 without refraction due to the refractive index of the panel 100 and the lens 125 being substantially the same. After reaching the outward-facing surface 112 within the aperture 315, the first internal portion 131a of the first incident ray 131 will travel through the air 114 as the first emergent portion 131b of the first incident ray 131 at the exterior 170.

The second incident ray 132 can be projected from the illumination source 120 through the lens 125 toward the panel 100. When the second incident ray 132 strikes the inward-facing surface 111, it will travel through the panel 100 without refracting, again due to the refractive index of the panel 100 and the lens 125 being substantially the same, to define the second internal portion 132a of the second incident ray 132. After reaching the outward-facing surface 112 within the aperture 315, the second internal portion 132a of the second incident ray 132 will travel through the air 114 as the second emergent portion 132b of the second incident ray 132 at the exterior 170 of or external to the vehicle.

Regardless of whether the second internal portion 132a of the second incident ray 132 reaches the boundary between the panel 100 and the air 114 at the outward-facing surface 112, at a critical angle or non-critical angle, the third internal portion 132c of the second incident ray 132 is reflected back through the second substrate layer 102. However, in various aspects, the mask layer 310 at the interface 115 between the first substrate layer 101 and the second substrate layer 102 is positioned to absorb the third internal portion 132c of the second incident ray 132. In this way, the mask layer 310 is configured to prevent the third internal portion 132c from proceeding into the vehicle interior 160 (e.g., into the cabin) or to prevent the TIR of the third internal portion 132c of the second incident ray 132 that would otherwise occur in the absence of the mask layer 310 thereby reducing light pollution within the vehicle interior 160.

The third incident ray 133 can also be projected from the illumination source 120 through the air 114 When the third incident ray 133 strikes the inward-facing surface 111, it will travel through the panel 100 without refracting, again due to the refractive index of the panel 100 and the lens 125 being substantially the same, to define the third internal portion 133a of the third incident ray 133. As illustrated, the mask layer 310 can be positioned along a portion of the interface 115 to absorb the third internal portion 133a of the third incident ray 133. to prevent light rays that diverge from a predetermined beam pattern from projecting from the panel 100 that would otherwise occur in the absence of the mask layer 310, thereby reducing light pollution within the vehicle interior 160.

The fourth incident ray 134 can also be projected from the illumination source 120 through the lens 125, and into the panel 100 as the fourth internal portion 134a of the fourth incident ray 134. However, as illustrated, the fourth internal portion 134a of the fourth incident ray 134 can strike the irregularity 19 disposed between the inward-facing surface 111 and the outward-facing surface 112. When the fourth internal portion 134a of the fourth incident ray 134 strikes the irregularity 19, a diffuse reflection of the fourth internal portion 134a of the fourth incident ray 134 can occur, resulting in a plurality of scatter reflections 134b, 134c, 134d at respective angles of reflection. The mask layer 310 positioned along a portion of inward-facing surface 111 can absorb at least some of the plurality of scatter reflections 134b, 134c, 134d to prevent at least some of the plurality of scatter reflections 134b, 134c, 134d from projecting from the panel 100 into the vehicle interior that would otherwise occur in the absence of the mask layer 310, thereby reducing light pollution within the vehicle interior 160.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched to form new aspects, whether or not the new aspects are expressly described. Combinations or permutations of features described herein are covered by this disclosure. Figures included and described herein are simplified representations of the behavior of light rays and do not imply any specific geometric shape to substrates.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A lighting system for a vehicle, comprising:

an illumination source disposed within the vehicle configured to emit a light output through a panel of the vehicle, the light output including a bundle of light rays; and a shroud including an opaque portion, at least partially enclosing the illumination source;

the panel including:

a first substrate layer having a first surface facing the illumination source, and an opposing second surface; and a mask layer defining light-absorbing properties and disposed on the first surface of the first substrate layer and arranged to define an aperture in registration with the illumination source, wherein the aperture is configured to allow a first portion of the light output from the illumination source to pass through the second surface of the first substrate layer, and wherein the mask layer is configured to absorb a second portion of the light output that is at least one of reflected or refracted by the first substrate layer;

wherein the shroud is coupled to the first surface along at least a portion of the mask layer and wherein the opaque portion is configured to absorb a Fresnel reflection from the first surface.

2. The lighting system of claim 1, wherein the second portion of the light output includes scattered light within the first substrate layer.

3. The lighting system of claim 1, wherein the first substrate layer comprises a multi-layered assembly.

4. The lighting system of claim 1, wherein the mask layer is further disposed on the second surface.

5. The lighting system of claim 1, wherein the second portion of the light output includes light rays having an angle of incidence greater than a critical angle of the first substrate layer.

6. The lighting system of claim 1, wherein the illumination source is spaced from the first surface.

7. The lighting system of claim 1, wherein the panel further includes a second substrate layer having a third surface facing the second surface, and an opposing fourth surface.

8. The lighting system of claim 7, wherein the mask layer is further disposed between the second surface and the third surface.

9. The lighting system of claim 1, wherein the light output is a non-visible light.

10. The lighting system of claim 1, wherein the second portion of the light output includes light rays having an angle of incidence to the first surface equal to or greater than a critical angle.

11. A lighting system for a vehicle, comprising:

an illumination source disposed within the vehicle configured to emit a light output through a panel of the vehicle, the light output including a bundle of light rays;

the panel including:

a first substrate layer having a first surface facing the illumination source, and an opposing second surface;

a second substrate layer having a third surface facing the second surface, and an opposing fourth surface; and a mask layer defining light-absorbing properties and disposed between the second surface and the third surface and arranged to define an aperture in registration with the illumination source, wherein the aperture is configured to allow a first portion of the light output from the illumination source to pass through the second surface of the first substrate layer, and wherein the mask layer is configured to absorb a second portion of the light output that is at least one of reflected or refracted by the first substrate layer.

12. The lighting system of claim 11, wherein the second portion of the light output includes light rays having an angle of incidence to the first surface equal to or greater than a critical angle.

13. The lighting system of claim 11, wherein the second portion of the light output includes a Fresnel reflection from the fourth surface.

14. The lighting system of claim 11, wherein the second portion of the light output includes scattered light within the second substrate layer.

15. The lighting system of claim 11, wherein the illumination source includes a shroud including an opaque portion, at least partially enclosing the illumination source, and the shroud coupled to the first surface wherein the opaque portion is configured to absorb a Fresnel reflection from the first surface.

16. The lighting system of claim 11, wherein the illumination source is spaced from the first surface.

17. The lighting system of claim 11, wherein the second portion of the light output includes light rays having an angle of incidence to the first surface equal to or greater than a critical angle.

18. The lighting system of claim 11, wherein the light output is a non-visible light.

19. A panel for a vehicle having an illumination source disposed within the vehicle, configured to emit a light output, the panel comprising:

a first substrate layer having a first surface optically coupled to the illumination source, and an opposing second surface;

a second substrate layer having a third surface facing the second surface, and an opposing fourth surface; and a mask layer defining light-absorbing properties and disposed between the second surface and the third surface and arranged to define an aperture in registration with the illumination source, wherein the aperture is configured to allow a first portion of the light output from the illumination source to pass through the first substrate layer, to illuminate an exterior to the vehicle, and wherein the mask layer is configured to absorb a second portion of the light output that is at least one of reflected or refracted by the first substrate layer.

20. The panel of claim 19, wherein the panel is a windshield of the vehicle.

* * * * *